US012251349B2

(12) United States Patent
Profitt

(10) Patent No.: US 12,251,349 B2
(45) Date of Patent: Mar. 18, 2025

(54) KNEE EXTENDER DEVICES AND RELATED METHODS

(71) Applicant: MARSHALL UNIVERSITY RESEARCH CORPORATION, Huntington, WV (US)

(72) Inventor: Brad Profitt, Huntington, WV (US)

(73) Assignee: MARSHALL UNIVERSITY RESEARCH CORPORATION, Huntington, WV (US)

( * ) Notice: Subject to any disclaimer, the term of this patent is extended or adjusted under 35 U.S.C. 154(b) by 655 days.

(21) Appl. No.: 16/939,523

(22) Filed: Jul. 27, 2020

(65) Prior Publication Data

US 2021/0022940 A1 Jan. 28, 2021

Related U.S. Application Data

(60) Provisional application No. 62/878,820, filed on Jul. 26, 2019.

(51) Int. Cl.
*A61H 1/02* (2006.01)

(52) U.S. Cl.
CPC ..... *A61H 1/024* (2013.01); *A61H 2201/1269* (2013.01); *A61H 2201/14* (2013.01); (Continued)

(58) Field of Classification Search
CPC ............ A61H 1/024; A61H 2201/1269; A61H 2201/14; A61H 2201/164; A61H 2201/1676; A61H 2205/102
See application file for complete search history.

(56) References Cited

U.S. PATENT DOCUMENTS

| | | | |
|---|---|---|---|
| 4,669,450 | A | 6/1987 | Lindberg |
| 4,784,121 | A | 11/1988 | Brooks |

(Continued)

FOREIGN PATENT DOCUMENTS

| | | | |
|---|---|---|---|
| WO | 95/06499 | A1 | 3/1995 |
| WO | 2012/124912 | A2 | 9/2012 |

OTHER PUBLICATIONS

Shelbourne, K. D., et al. (2006). "What I have learned about the ACL: Utilizing a progressive rehabilitation scheme to achieve total knee symmetry after anterior cruciate ligament reconstruction." Journal of Orthopaedic Science: Official Journal of the Japanese Orthopaedic Association, 11(3), 318-325. doi:10.1007/s00776-006-1007-z.

(Continued)

*Primary Examiner* — Jerrah Edwards
*Assistant Examiner* — Aren Patel
(74) *Attorney, Agent, or Firm* — Stites & Harbison, PLLC; Terry L. Wright; Gary N. Stewart

(57) ABSTRACT

A knee extender device includes a central connecting portion, and a first support leg and a second support leg that each extend downwardly from the central connecting portion and that are positioned at an angle relative to each other. A terminal portion is attached to each support leg, with each terminal portion configured to be positioned against an upper leg or a lower leg of an individual. In use, as part of a method of rehabilitating a knee joint of an individual, the device is applied to a leg of the individual adjacent to and over the knee joint, and a cord or belt is extended over at least part of the central connecting portion and around a foot of the individual. Upon applying tension to the cord or belt, the knee extender device is then pushed downward to thereby extend the knee of the individual.

20 Claims, 11 Drawing Sheets

(52) U.S. Cl.
CPC .................. *A61H 2201/164* (2013.01); *A61H 2201/1676* (2013.01); *A61H 2205/102* (2013.01)

(56) References Cited

U.S. PATENT DOCUMENTS

| | | | | |
|---|---|---|---|---|
| 4,844,454 | A | 7/1989 | Rogers | |
| 5,213,094 | A * | 5/1993 | Bonutti | A61F 5/0123 601/33 |
| 5,236,333 | A | 8/1993 | Barba, Jr. | |
| 5,286,242 | A | 2/1994 | Johnston | |
| 5,303,716 | A | 4/1994 | Mason et al. | |
| 5,647,823 | A | 7/1997 | Spence | |
| 5,662,562 | A | 9/1997 | Wohlenberg | |
| 6,024,679 | A | 2/2000 | Castallanos et al. | |
| 6,165,112 | A | 12/2000 | Morris | |
| 6,821,262 | B1 | 11/2004 | Muse et al. | |
| 6,962,570 | B2 * | 11/2005 | Callanan | A61H 1/024 601/5 |
| 8,142,338 | B2 | 3/2012 | Johnson | |
| 8,343,080 | B2 | 1/2013 | Shelbourne | |
| 8,376,918 | B2 | 2/2013 | Itzkowitz | |
| 8,500,613 | B2 | 8/2013 | Eddy | |
| 8,801,640 | B2 | 8/2014 | Sevy et al. | |
| 9,375,377 | B1 * | 6/2016 | Edwards | A61F 5/0123 |
| 9,526,945 | B1 | 12/2016 | Edmondson | |
| 9,655,803 | B2 | 5/2017 | Hall | |
| 9,895,577 | B2 | 2/2018 | Montgomery | |
| 9,999,561 | B2 | 6/2018 | Nelson | |
| 2007/0161479 | A1 | 7/2007 | Harris | |
| 2008/0287850 | A1 * | 11/2008 | Adarraga | A63C 9/00 602/26 |
| 2016/0271443 | A1 * | 9/2016 | Malizia | A61H 1/024 |
| 2016/0361222 | A1 * | 12/2016 | Publicover | A61F 5/0123 |

OTHER PUBLICATIONS

Chaparro-Rico, B. D. M., et al. (2016). Design of a 2DOF parallel mechanism to assist therapies for knee rehabilitation. Ingeniería e Investigación, 36(1), 98-104. DOI: http://dx.doi.org/10.15446/ing.investig.v36n1.53191.http://www.scielo.org.co/scielo.php?script=sci_arttext& pid=S0120-56092016000100013.

"Knee Exerciser Pro," OLe! LLC, kneeexerciserpro.com, Feb. 13, 2019.

* cited by examiner

KNEE EXTENDER DEVICES AND RELATED METHODS

RELATED APPLICATIONS

This application claims priority from U.S. Provisional Application Ser. No. 62/878,820, filed Jul. 26, 2019, the entire disclosure of which is incorporated herein by this reference.

TECHNICAL FIELD

The present invention generally relates to knee extender devices for use in physical therapy. In particular, certain embodiments of the present invention relate to knee extender devices that are configured to promote knee extension in a post-surgical or post-injury situation and that allow an individual to regain terminal extension as a means to regain a normal range of motion in their knee.

BACKGROUND

Various knee injuries and surgeries often result in an individual experiencing a decrease in the range of motion in their knee joint. Indeed, such reductions in range of motion are entirely common for individuals experiencing anterior or posterior cruciate ligament reconstructions, medial and lateral collateral ligament repair, meniscus tears, femur fractures, tibia plateau fractures, total knee arthroplasty, or similar injuries that result in stiffness in the knee of the individual. As such, it has become entirely routine for physicians and other medical care providers to recommend some form of physical therapy following such injuries and, more often than not, the prescribed physical therapy includes the use of one or more mechanical devices that mechanically extend a patient's knee as a means to restore a fuller range of motion.

The mechanical devices developed to date, however, are often complex, difficult to operate or transport, and cause an undue amount of pain to a patient undergoing physical therapy. Such difficulties, in turn, lead to reduced patient compliance and ultimately a reduction in the amount of range of motion that can be recovered by the patient post-surgery or post-injury. Accordingly, a device that promotes knee extension and that allows a patient to more simply regain a greater range of motion in a controlled and less painful manner would be both highly desirable and beneficial.

SUMMARY

The present invention includes knee extender devices for use in physical therapy, including, in particular, use in a post-surgical or post-injury setting.

In one exemplary embodiment of the present invention, a knee extender device is provided that includes a central connecting portion attached to a first support leg and a second support leg that each extend downwardly from the central connecting portion at an angle relative to each other. The knee extender device further includes a first terminal portion that is attached to the first support leg opposite the central connecting portion and a second terminal portion that is connected to the second support leg opposite the central connecting portion.

To attach the first support leg and the second support leg to the central connecting portion, the central connecting portion includes a first connecting member and a second connecting member that each extend downwardly away from a curved upper surface of the central connecting portion. More specifically, each connecting member is comprised of an outer connecting member positioned on the outside of the central connecting portion and an inner connecting member that is positioned on the inside of the central connecting portion, with each pair of outer and inner connecting members being positioned at an angle relative to the other pair of outer and inner connecting members. Each of the outer connecting members and each of the inner connecting members then further define a respective slot for receiving and attaching the first support leg and second support leg to the central connecting portion.

To attach the first support leg and the second support leg to the first terminal portion and to the second terminal portion, respectively, the first terminal portion and the second terminal portion each similarly include a terminal connecting member that extends upwardly away from a curved lower surface of each terminal portion. Each terminal connecting member also defines a slot for receiving and attaching the first support leg and the second support leg to the terminal portions of the device. The curved lower surfaces of the first terminal portion and the second terminal portion each have a generally concave shape that allows the lower surfaces to be comfortably positioned on the individual's leg. To further increase the comfort of the knee extender device, the exemplary knee extender device further includes a pad that is secured to the curved lower surface of the terminal portions.

In use, the knee extender device is positioned against a leg of an individual with the first terminal portion positioned against the lower leg of an individual and below the individual's knee joint and with the second terminal portion positioned above the knee joint and against the upper leg of the individual, such that the central connecting portion is generally positioned above the individual's knee joint. A cord or belt is then passed over the curved upper surface of the central connecting portion, around the foot of the individual, and then back over the central connecting portion. In this way, as the individual subsequently pulls on the two ends of the cord or belt, the knee extender device is pushed downward due to the tension being applied to the cord or belt and the force applied to the convex curvature of the curved upper surface. Such downward force, in turn, then causes the device to extend the knee of the individual in a controlled manner.

In further embodiments of the present invention, exemplary knee extender devices are provided having additional or alternative features to allow the exemplary knee extender devices to be utilized as an effective physical therapy tool. In one other exemplary embodiment of the present invention, a knee extender device is provided that comprises a central eyelet as a central connecting portion that is used to further secure a cord against the knee extender device. In a further exemplary embodiment, and to further provide an amount of control over the force being applied to a knee extender device of the present invention, a knee extender device is provided that, rather than including a single central eyelet in the knee extender device, includes three central eyelets that are spaced at an angle relative to one another atop the knee extender device. As yet another refinement, in an additional embodiment of the present invention, a knee extender device is provided that is capable of being adjusted between an expanded and collapsed configuration through the use of support legs that are connected to one another and to the central eyelets or central connecting portion at a pivot joint, such that the support legs can pivot about an axis and relative to one another. As an even further refinement, in another embodiment, a knee extender device is provided that is configured to also increase or decrease the distance between the knee extender device and the knee joint itself by including support legs configured to telescope and extend from a first, shortened position to a second, lengthened position, or vice versa.

Further features and advantages of the present invention will become evident to those of ordinary skill in the art after a study of the description, figures, and non-limiting examples in this document.

DESCRIPTION OF EXEMPLARY EMBODIMENTS

Figure 1:
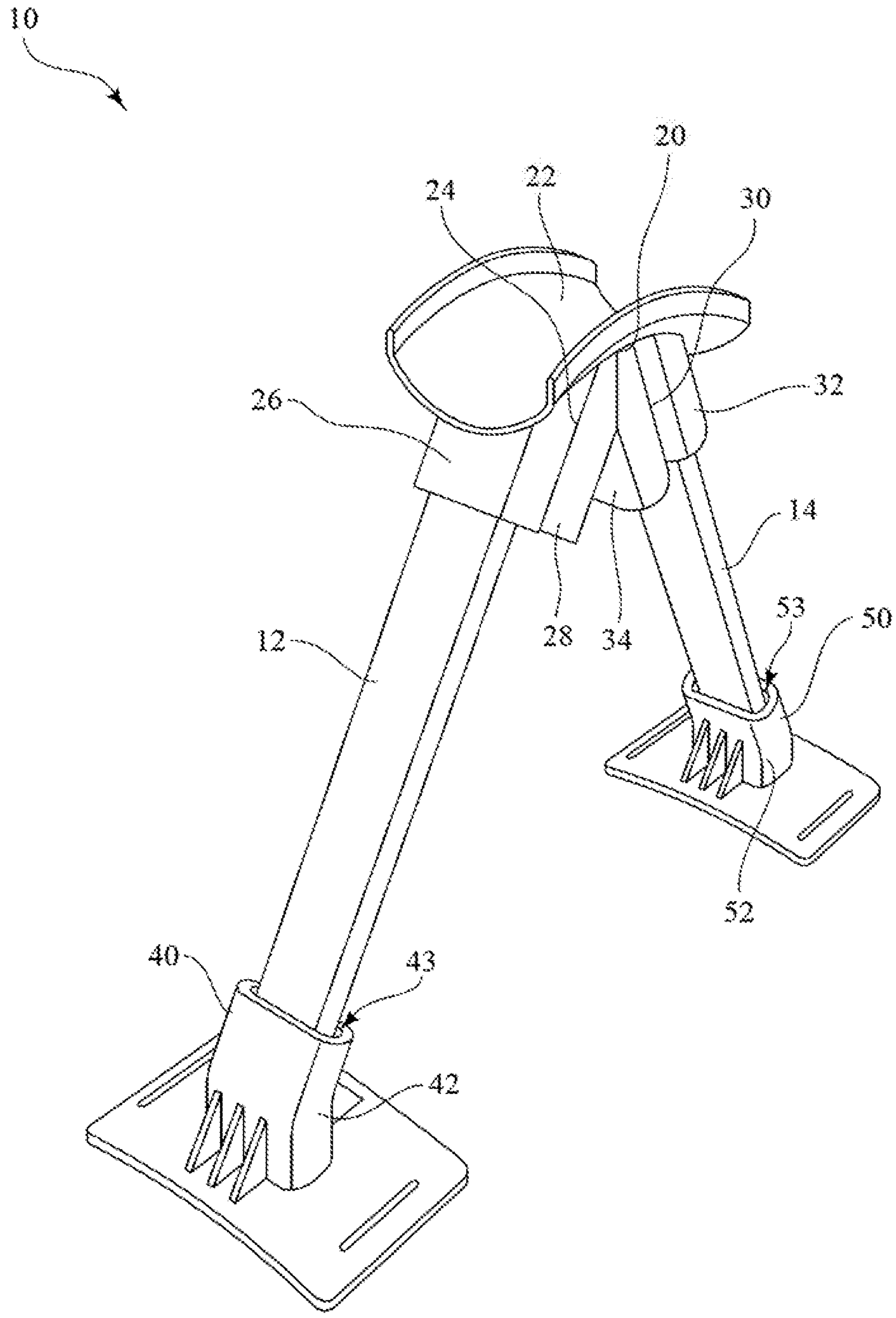
FIG. 1 is a perspective view of a knee extender device made in accordance with the present invention.

The present invention includes knee extender devices for use in physical therapy, including, in particular, use in a post-surgical or post-injury setting.

Referring first to FIGS. 1-5, in one exemplary embodiment of the present invention, a knee extender device 10 is provided that comprises a central connecting portion 20 attached to a first support leg 12 and a second support leg 14. The first support leg 12 and the second support leg 14 each extend downwardly from the central connecting portion 20 and, more particularly, the first support leg 12 and the second support leg 14 extend downwardly from the central connecting portion 20 at an angle (i.e., less than 180°) relative to each other. The knee extender device 10 then further includes a first terminal portion 40 that is attached to the first support leg 12 opposite the central connecting portion 20 and a second terminal portion 50 that is connected to the second support leg 14 opposite the central connecting portion 20.

To attach the first support leg 12 and second support leg 14 to the central connecting portion 20, the central connecting portion 20 includes a first connecting member 24 and a second connecting member 30 that each extend downwardly away from a curved upper surface 22 of the central connecting portion 20. The first connecting member 24 is comprised of an outer connecting member 26 positioned on the outside of the central connecting portion 20 and an inner connecting member 28 that is positioned on the inside of the central connecting portion 20 and adjacent to the second connecting member 30. The second connecting member 30 similarly includes an outer connecting member 32 positioned on the outside of the central connecting portion 20 opposite the outer connecting member 26 of the first connecting member 24, and an inner connecting member 34 positioned on the inside of the central connecting portion 20 and adjacent to the inner connecting member 28 of the first connecting member 24. The inner connecting member 28 and the outer connecting member 26 of the first connecting member 24 are positioned on the central connecting portion 20 at an angle relative to the inner connecting member 34 and outer connecting member 32 of the second connecting member 30. Further, each of the outer connecting members 26, 32 and each of the inner connecting member 28, 34 define a respective slot 27, 29, 33, 35 for receiving and attaching the first support leg 12 and second support leg 14 to the central connecting portion 20. In this way, and as perhaps shown best in FIGS. 4A-4C, the first support leg 12 can readily be positioned in either the outer connecting member 26 or the inner connecting member 28 of the first connecting member 24, while the second support leg 14 can be positioned in either the outer connecting member 32 or the inner connecting member 34 of the second connecting member 30 to allow the first support leg 12 and second support leg 14 to be positioned at various angles relative to one another and to be effectively used to extend the knee joint of individuals of various sizes and requiring different amounts or directions of force, as described below.

Figure 4A:
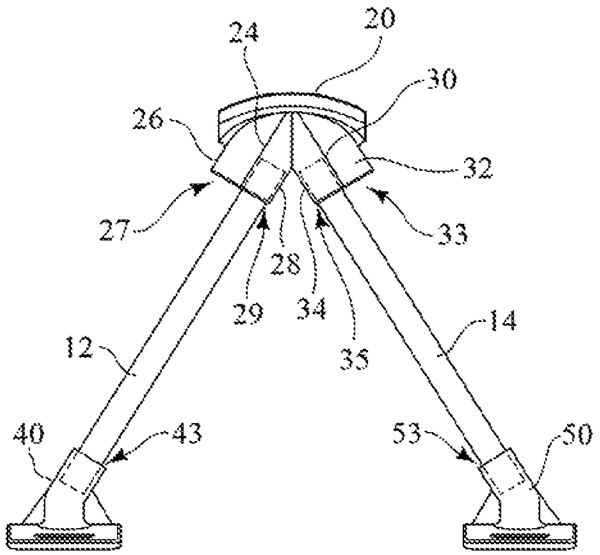
FIGS. 4A-4C are side views of the knee extender device of FIG. 1 and showing the support legs of the device attached to the central connecting portion in various configurations.
Figure 4B:
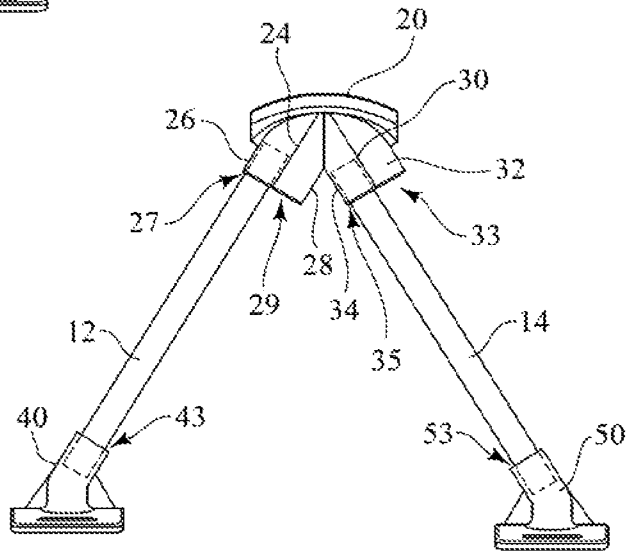
Figure 4C:
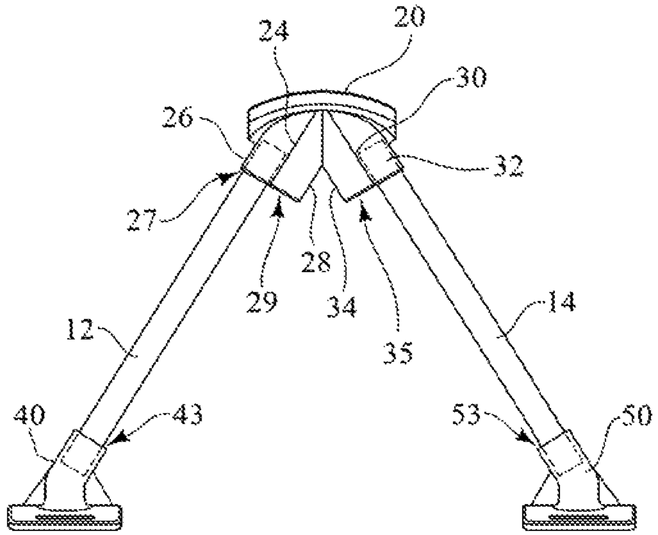
Figure 5:
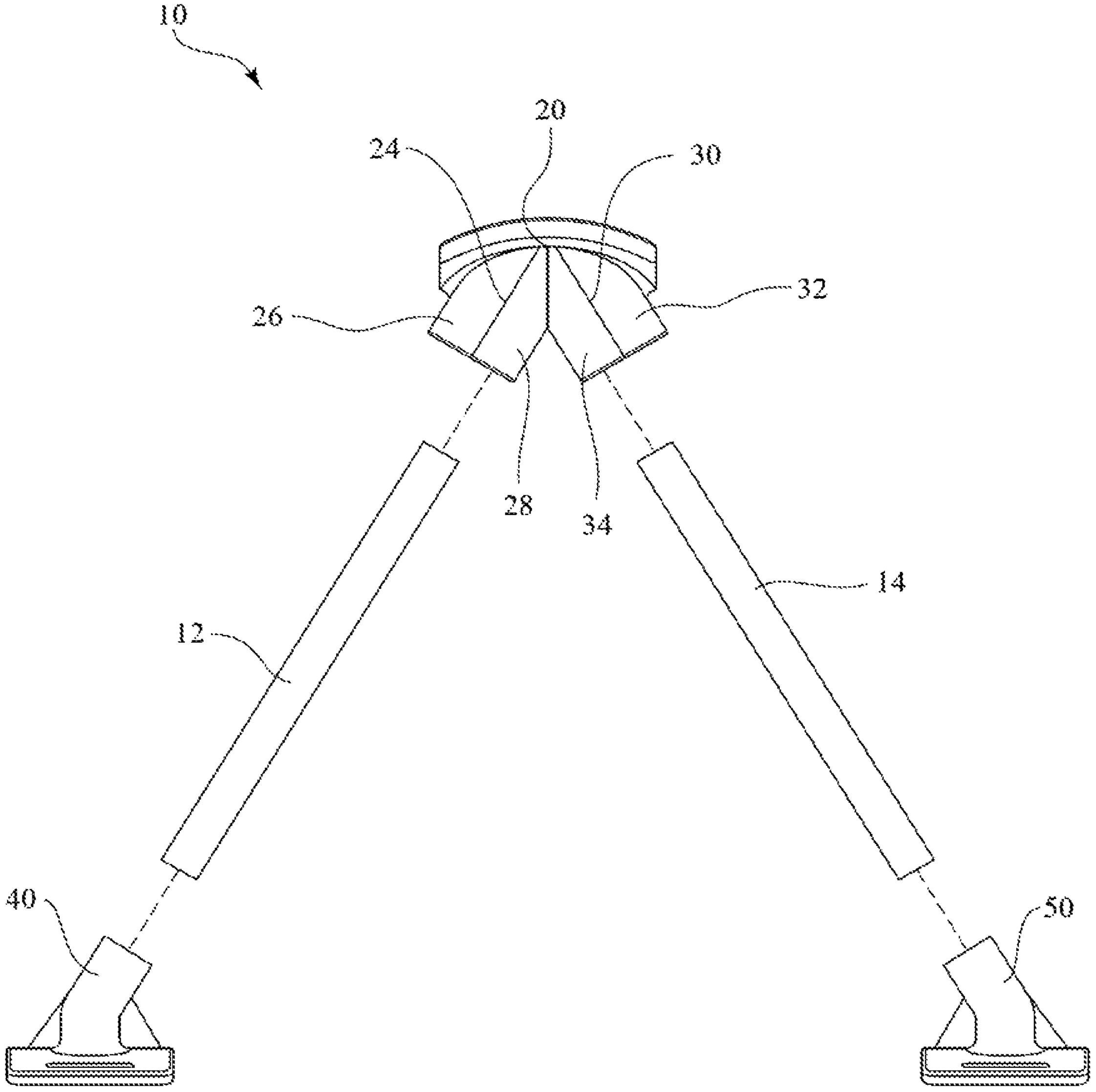
FIG. 5 is an exploded side view of the knee extender device of FIG. 1.

As an example of the different configurations of the first support leg 12 and second support leg 14, and as shown in FIG. 4A, the first support leg 12 can be positioned in the slot 29 of the inner connecting member 28 of the first connecting member 24 and the second support leg 14 can be positioned in the slot 35 of the inner connecting member 34 of the second connecting member 30 to position the first support leg 12 and second support leg 14 at a smaller angle relative to one another. Alternatively, as another example and as shown in FIG. 4B, the first support leg 12 can be positioned in the slot 27 of the outer connecting member 26 of the first connecting member 24 and the second support leg 14 can be positioned in the slot 35 of the inner connecting member 34 of the second connecting member 30 to position the first support leg 12 and second support leg 14 at an intermediate angle relative to one another. As yet another example, and as shown in FIG. 4C, the first support leg 12 can also be positioned in the slot 27 of the outer connecting member 26 of the first connecting member 24 and the second support leg 14 can be positioned in the slot 33 of the outer connecting member 32 of the second connecting member 30 to position the first support leg 12 and second support leg 14 at a wider angle relative to one another. Of course, to provide an exemplary knee extender device capable of being placed in various configurations, it is also contemplated that support legs having various lengths can readily be incorporated into an exemplary knee extender device without departing from the spirit and scope of the subject matter described herein.

Regardless of the desired configuration and/or length of the first support leg 12 and second support leg 14, and referring more generally again to FIGS. 1-5, to connect the first support leg 12 and the second support leg 14 to the first terminal portion 40 and to the second terminal portion 50, respectively, the first terminal portion 40 and the second terminal portion 50 each similarly include a terminal connecting member 42, 52 that extends upwardly away from a curved lower surface 44, 54 of each terminal portion 40, 50. Each terminal connecting member 42, 52 also defines a slot 43, 53 for receiving and attaching the first support leg 12 and the second support leg 14 to the first terminal portion 40 and the second terminal portion 50.

To allow the knee extender device 10 to be effectively used as a physical therapy tool and to allow the knee extender device 10 to be placed against the leg of an individual with the central connecting portion 20 positioned over the knee joint, the curved lower surfaces 44, 54 of the first terminal portion 40 and the second terminal portion 50 each have a generally concave shape that allows the lower surfaces 44, 54 to be comfortably positioned on the individual's leg. To further increase the comfort of the knee extender device 10, the knee extender device 10 further includes a pad 45, 55 that is secured to the curved lower surfaces 44, 54 of the first terminal portion 40 and second terminal portion 50 of the knee extender device 10. In the knee extender device 10, each pad 45, 55 is comprised of a foam rubber, but it is of course contemplated that any cushioning material may similarly be used.

With further respect to the materials used to produce the knee extender devices made in accordance with the present invention, the exemplary knee extender devices are generally comprised of a sufficiently hard and rigid material to allow the knee extender devices to be pushed downward against the leg of a subject and extend the knee in a controlled manner, as described in further detail below. In this regard, the knee extender devices are generally comprised of a metal or sufficiently hard plastic material, but can be also be comprised of any number of other sufficiently hard and rigid materials without departing from the spirit and scope of the subject matter described herein.

Figure 2:
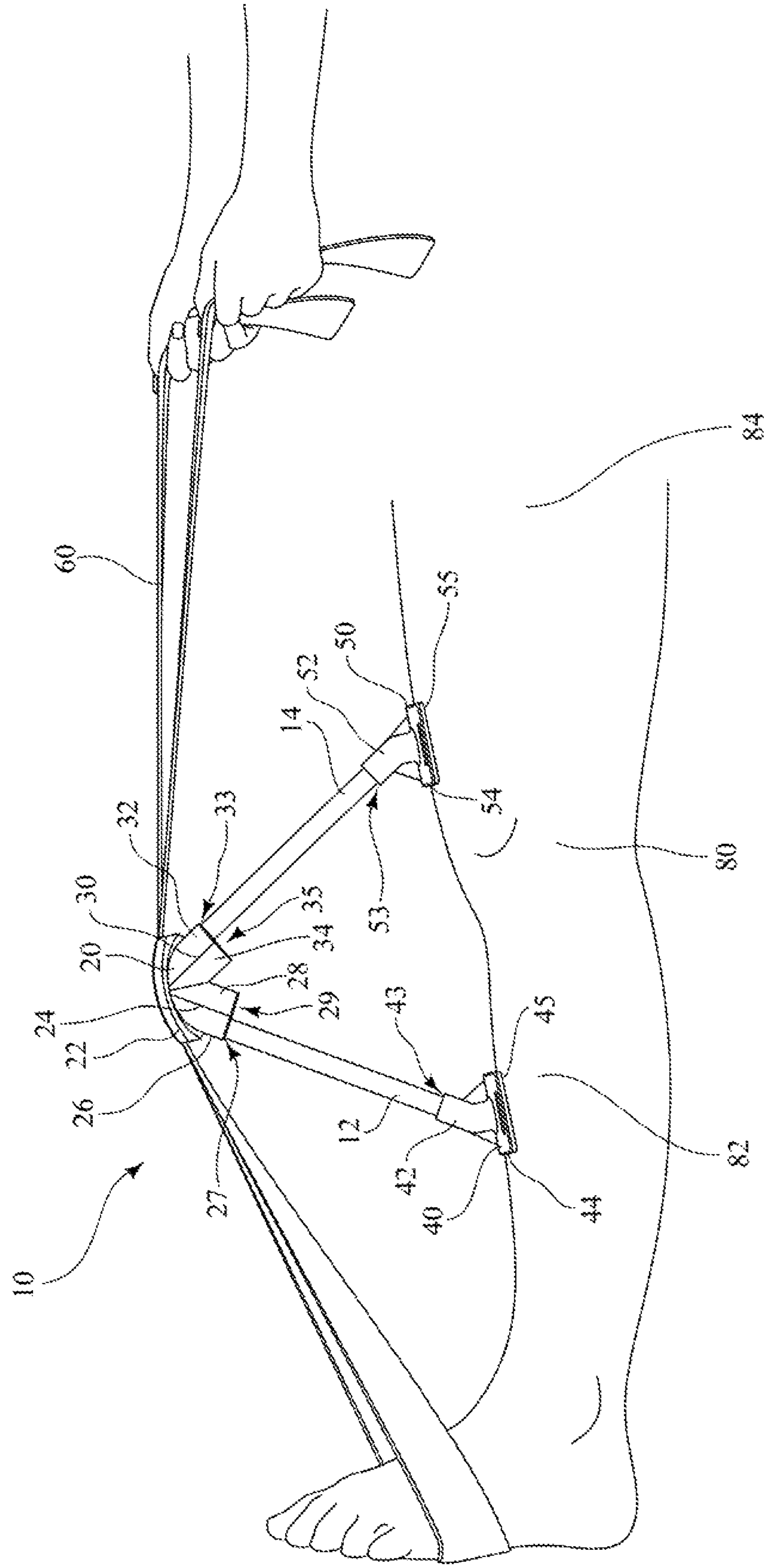
FIG. 2 is a side view of the knee extender device of FIG. 1 and showing the device being used to extend the knee of an individual.
Figure 3:
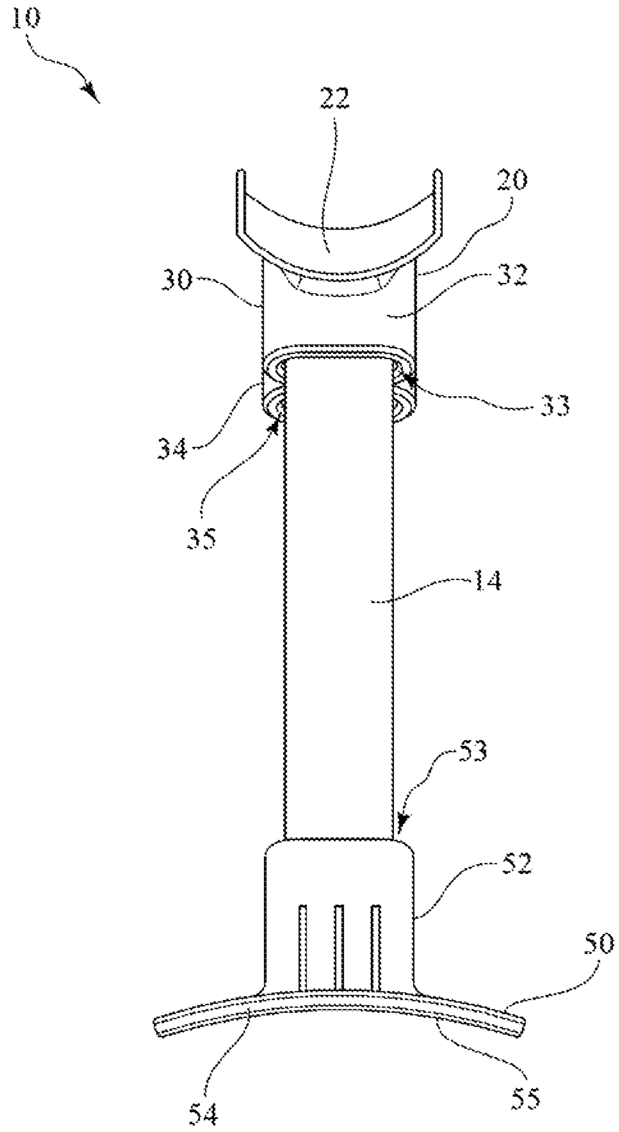
FIG. 3 is a front view of the knee extender device of FIG. 1.

Referring now more particularly to FIG. 2, in use, the knee extender device 10 is positioned against a leg of an individual with the first terminal portion 40 positioned against the lower leg 82 of the individual and below the individual's knee joint 80 and with the second terminal portion 50 positioned above the knee joint 80 and against the upper leg 84 of the individual, such that the central connecting portion 20 is generally positioned above the individual's knee joint 80. A belt 60 is then passed over the curved upper surface 22 of the central connecting portion 20, around the foot of the individual, and then back over the central connecting portion 20. In this way, as the individual subsequently pulls on the two ends of the belt 60, the knee extender device 10 is pushed downward due to the tension being applied to the belt 60 and the force being applied to the convex curvature of the curved upper surface 22, which is in form of a hyperbolic paraboloid in the knee extender device 10. Such downward force, in turn, then causes the device to extend the knee of the individual in a manner that allows the individual to control the amount of downward force being applied to the knee extender device 10 by controlling the amount of force with which the individual pulls on the two ends of the belt 60. Moreover, by making use of the belt 60 and knee extender device 10 in such a manner, the individual is able to oscillate the movement or force being applied by the device 10 as a means to also control the neurological pain being experienced by the individual during physical therapy. In some embodiments, to secure the belt 60 around the foot (e.g., the heel) of an individual and add an additional amount of stability, a heel cup or strap having a width greater than the belt 60 can be secured over or otherwise operably connected to the belt 60, and then utilized to provide a more stable means to wrap the belt 60 around the Achilles tendon or lower leg and foot of the individual. Moreover, while the embodiment of the knee extender device 10 shown in FIG. 2 shows the belt 60 positioned over the curved upper surface 22 of the central connecting portion 20, around the foot of the individual, and then back over the central connecting portion 20, it is contemplated that a number of configurations for an exemplary belt can be utilized to apply the downward force necessary to extend the knee of an individual. For instance, in some embodiments, it is contemplated that an exemplary belt can be a single strap that includes a loop at one end for placement around the foot of an individual such that the strap does not need to be pulled back over the curved upper surface of an exemplary knee extender device.

Figure 6:
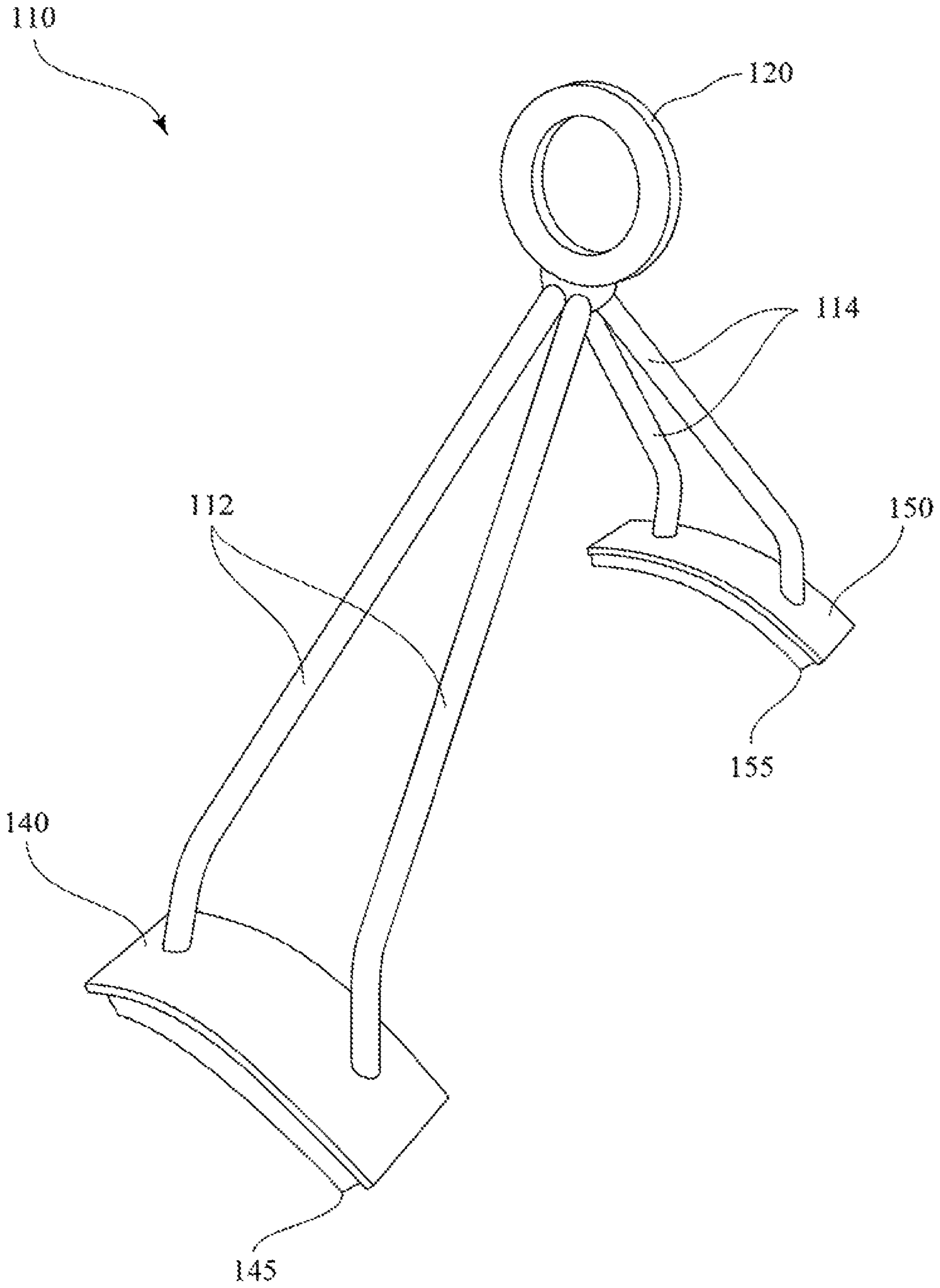
FIG. 6 is a perspective view of another knee extender device made in accordance with the present invention.
Figure 7:
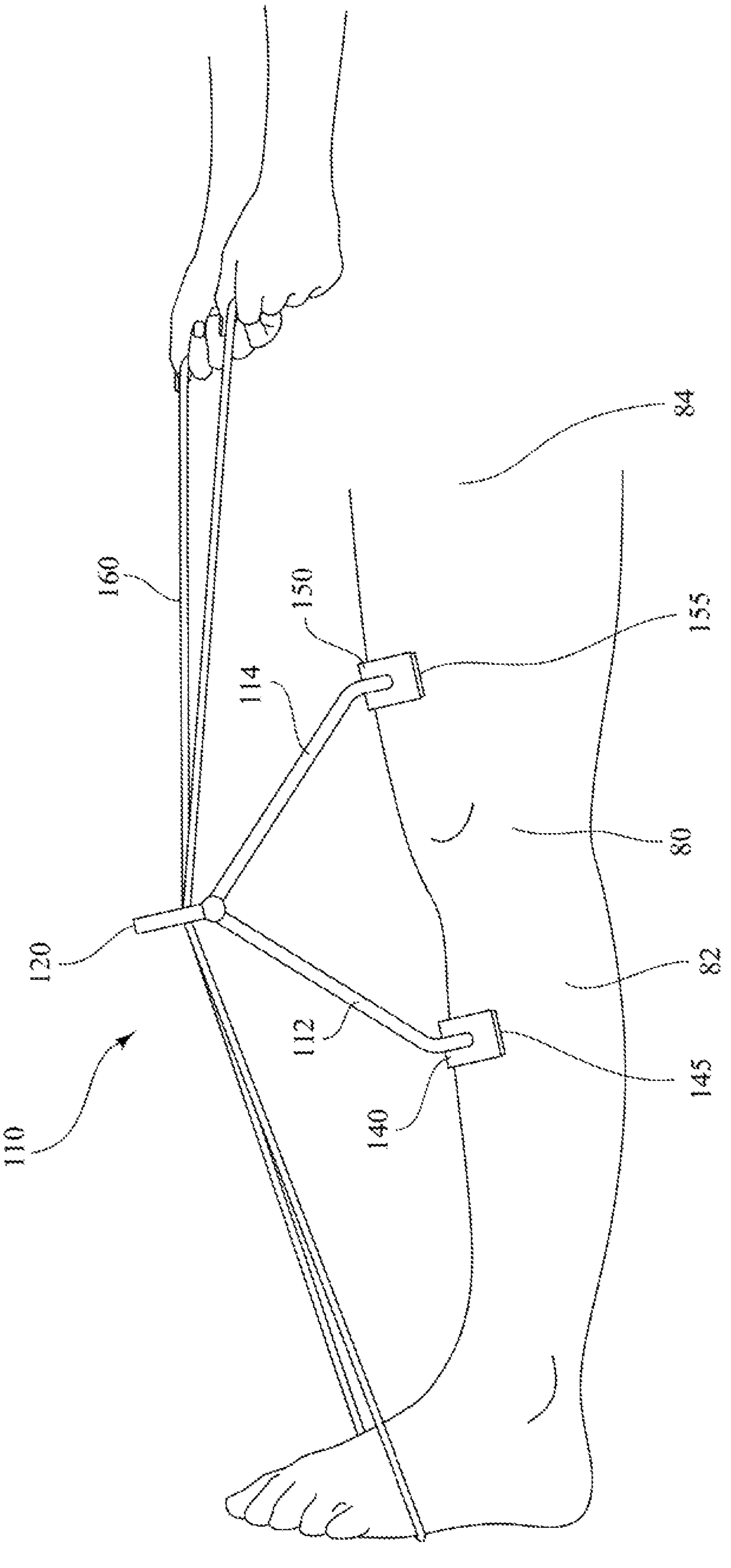
FIG. 7 is a side view of the knee extender device of FIG. 6 and showing the device being used to extend the knee of an individual.
Figure 8:
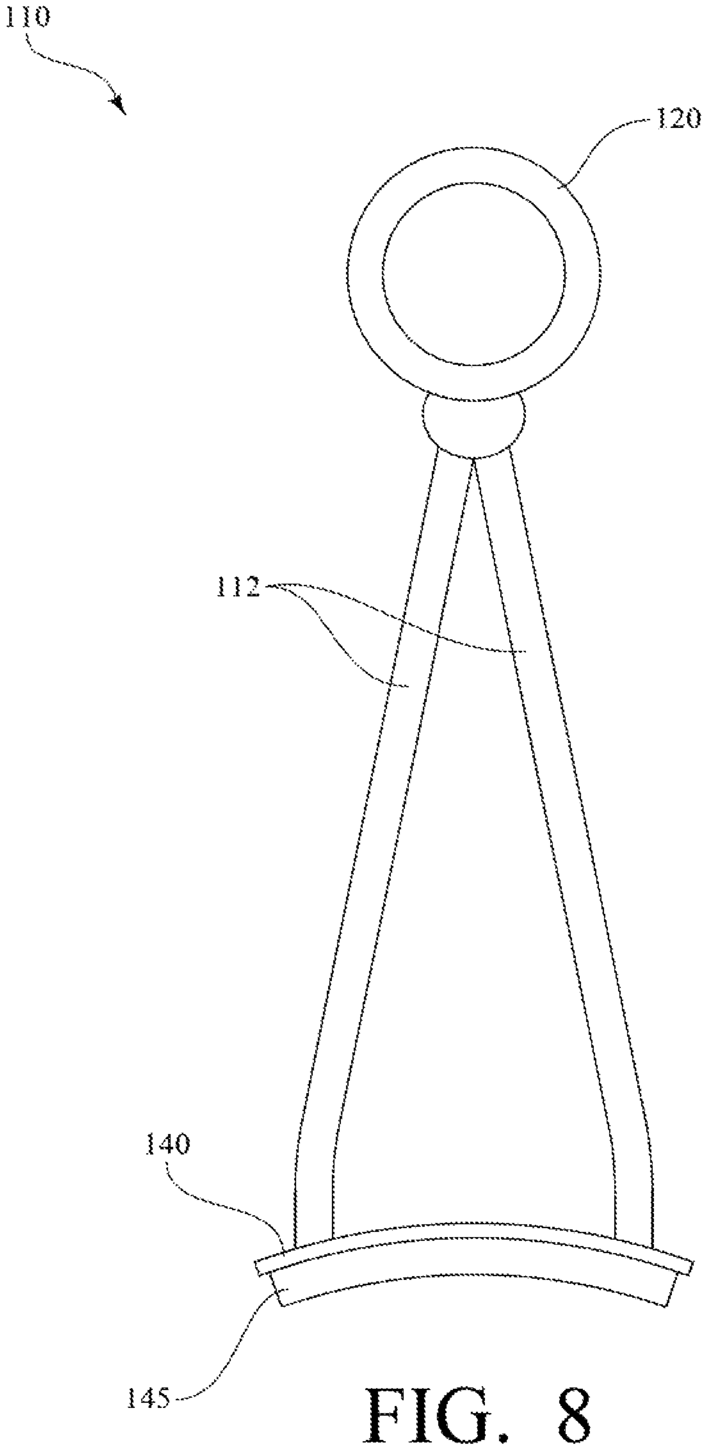
FIG. 8 is a back view of the knee extender device of FIG. 6.

As a refinement, in some embodiments of the knee extender devices of the present invention, further exemplary knee extender devices can be provided having additional or alternative features to allow the exemplary knee extender devices to be utilized as an effective physical therapy tool. Referring now to FIGS. 6-8, in another exemplary embodiment of the present invention, a knee extender device 110 is provided that comprises a central eyelet 120 used to further secure a cord 160 against the knee extender device 110. In the knee extender device 110, the central eyelet 120 is connected to two pairs of support legs 112, 114. Each of the two pairs of support legs 112, 114 extend downwardly from the central eyelet 120 at an angle (i.e., less than 180°) relative to one another. A terminal curved portion 140, 150 is then similarly attached to an end of each of the support legs 112, 114 opposite the central eyelet 120, with each terminal curved portion 140, 150 having a shape configured to allow the knee extender device 110 to be positioned against the upper leg 84 and lower leg 82 of an individual, as shown in FIG. 7. The knee extender device 110 then further includes a pad 145, 155 that is secured to the underside of each terminal curved portion 140, 150.

Similar to the knee extender device 10 shown in FIGS. 1-5, in use, the knee extender device 110 is also positioned against a leg of a user with the first terminal portion 140 positioned against the lower leg 82 of an individual and below the individual's knee joint 80, and with the second terminal portion 150 positioned above the knee joint 80 and against the upper leg 84 of the individual, such that the central eyelet 120 is generally positioned above the individual's knee joint 80. A cord 160 is then passed through the central eyelet 120, around the foot of the individual, and then back through the central eyelet 120. In this way, as the individual subsequently pulls on the two ends of the cord 50, the knee extender device 10 is pushed downward while the cord 160 remains contained within the central eyelet 120.

Figure 9:
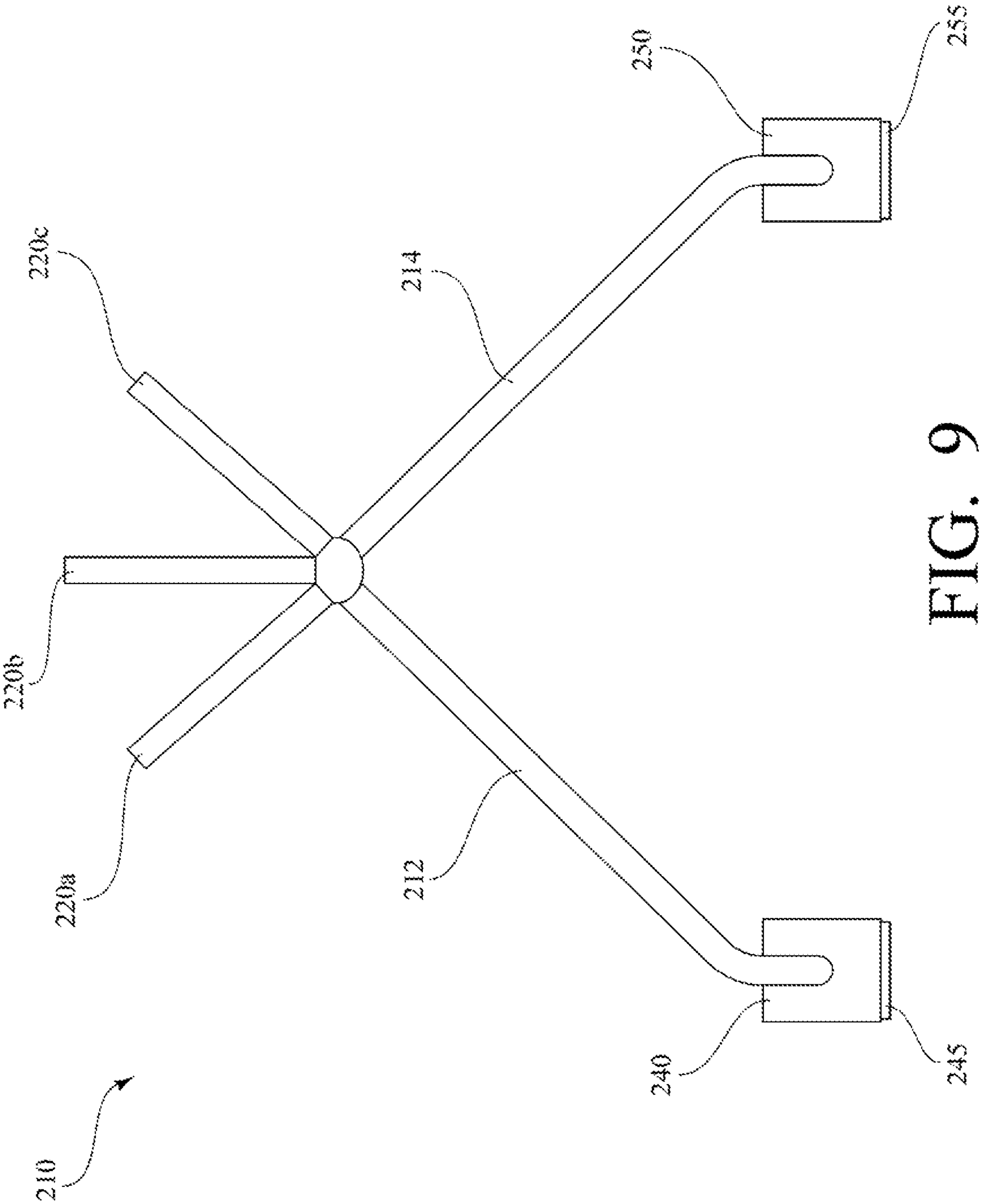
FIG. 9 is a side view of another knee extender device made in accordance with the present invention, and including three central eyelets.

To further provide an amount of control over the force being applied to a knee extender device of the present invention, and referring now to FIG. 9, a knee extender device 210 is provided that, like the knee extender device 110 shown in FIGS. 6-8, includes two pairs of support legs 212, 214 that terminate at terminal portions 240, 250 having pads 245, 255 for comfortably placing the terminal portions 240, 250 against the leg of an individual. Rather than including a single central eyelet in the knee extender device 210, however, the knee extender device 210 includes three central eyelets 220*a*, 220*b*, 220*c* that are spaced at an angle relative to one another atop the knee extender device 210. In this way, upon placing a cord (not shown) through the three central eyelets 220*a*, 220*b*, 220*c* and around the foot of an individual, the three central eyelets 220*a*, 220*b*, 220*c* are thus configured to promote an additional amount of stability as the cord is pulled and are used to produce the vector of anterior to posterior force into the knee joint of the individual.

Figure 10A:
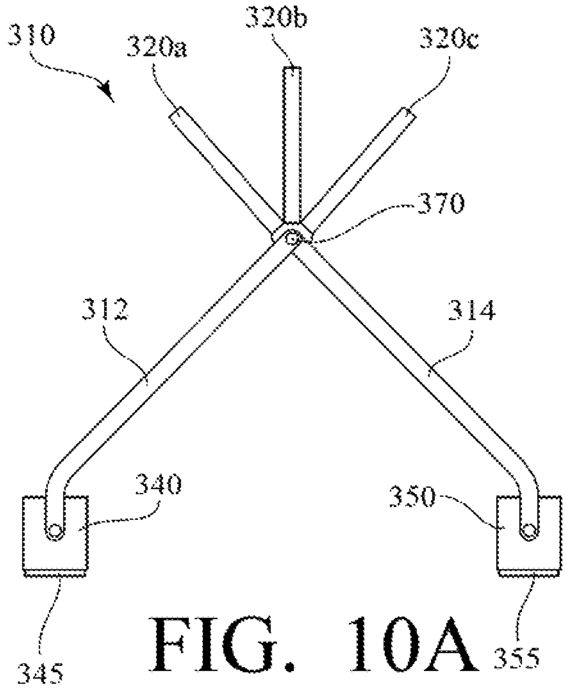
FIGS. 10A-10C are side views of another knee extender device made in accordance with the present invention and including three central eyelets positioned adjacent to a pivot joint for expanding and collapsing the device.
Figure 10B:
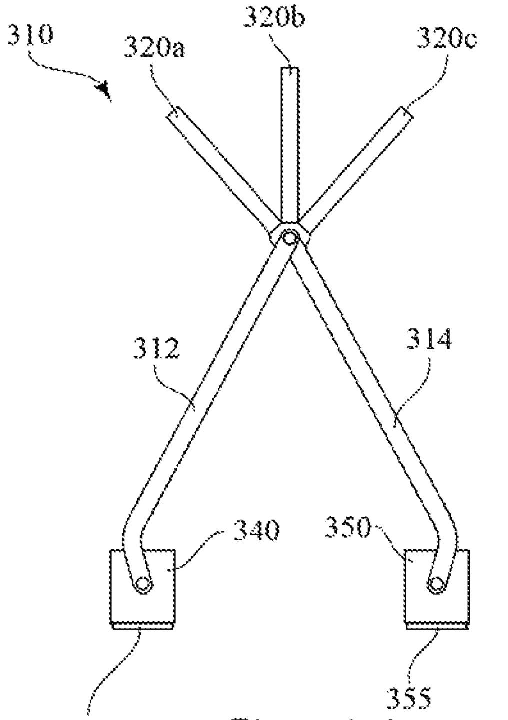
Figure 10C:
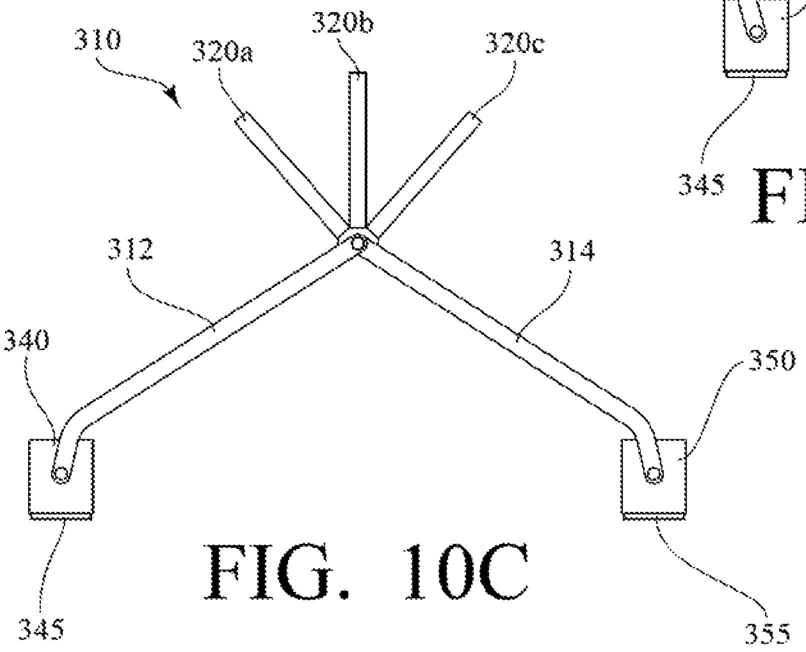

As a further refinement, and referring now to FIGS. 10A-10C, in another embodiment of the present invention, a knee extender device 310 is provided that is capable of being adjusted between an expanded and collapsed configuration. In particular, the knee extender device 310 includes three central eyelets 320*a*, 320*b*, 320*c* that are connected to the two pairs of support legs 312, 314 with a terminal curved portion 340, 350 and associated pad 345, 355 connected to each respective one of the two pairs of support legs 312, 314 opposite the central eyelets 320*a*, 320*b*, 320*c*. In the knee extender device 310, however, the two pairs of support legs 312, 314 are connected to one another and to the central eyelets 320*a*, 320*b*, 320*c* at a pivot joint 370 that allows the two pairs of support legs 312, 314 to pivot about an axis and relative to one another, such that the knee extender device 310 can be positioned in a normal position, as shown in FIG. 10A, in a more collapsed position, as shown in FIG. 10B, or in an expanded position, as shown in FIG. 10C. By allowing the two pairs of support legs 312, 314 to be positioned closer to one another or further apart, the terminal curved portions 340, 350 can thus be positioned closer to or further away from the knee of the individual. This positioning, in turn, not only allows the knee extender device 310 to be configured to fit all sizes of individuals (e.g., adults vs. children), but also allows the knee extender device 310 to be capable of being used with various types of knee pathologies and surgeries that require terminal extension as a means to regain a range of motion.

Figure 11A:
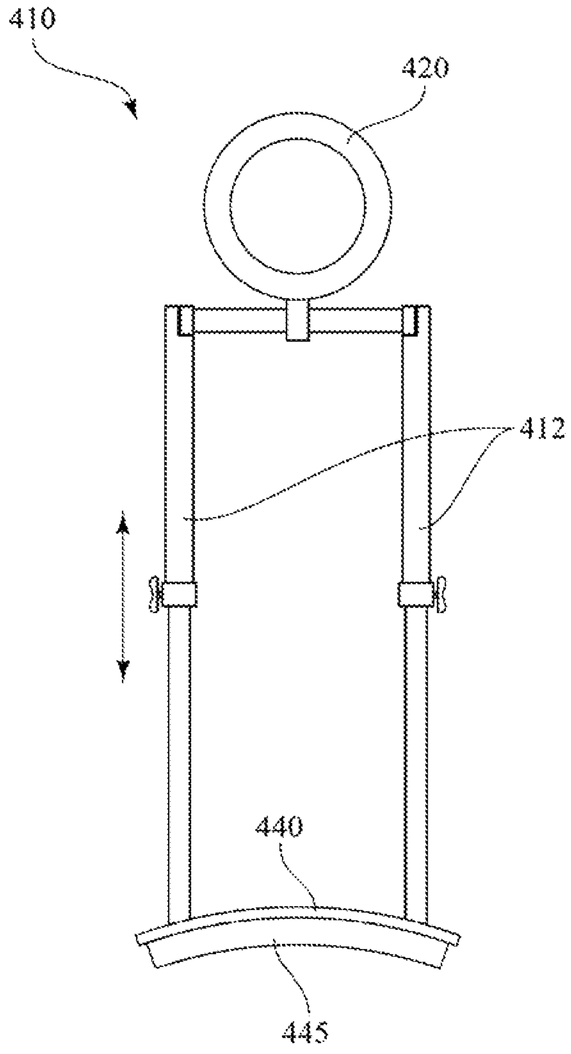
FIGS. 11A-11B are side views of another knee extender device made in accordance with the present invention, and including telescoping legs for customizing the length of the legs of the device.
Figure 11B:
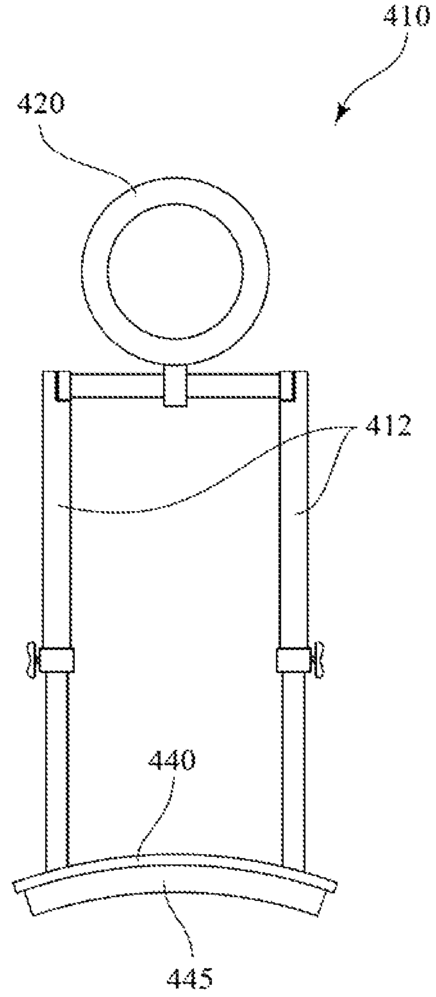

As an even further refinement to the knee extender devices of the present invention, and referring now to FIGS. 11A-11B, a knee extender device 410 is provided that is configured to also increase or decrease the distance between the knee extender device 410 and the knee joint itself. The knee extender device 410, similar to the knee extender device 110 shown in FIGS. 6-8 includes a central eyelet 420 and two pairs of support legs 412 (only one of which is shown in FIGS. 11A-11B) extending downwardly from the central eyelet 420 and terminating at a terminal portion 440 having a pad 445. Rather than including pairs of support legs having a fixed length, however, the support legs 412 in the knee extender device 410 are configured to telescope and extend from a first, shortened position (shown in FIG. 11B) to a second, lengthened position (shown in FIG. 11A), or vice versa. Upon increasing or decreasing the length of the support legs 412, the telescoping ability of the knee extender device 410 thereby allows the distance between the central eyelet 420 and the knee joint to be increased or decreased and, in turn, allows for a concomitant increase or reduction in the moment arm acting on the knee joint of an individual.

It will be understood that various details of the presently-disclosed subject matter can be changed without departing from the scope of the subject matter disclosed herein. Furthermore, the foregoing description is for the purpose of illustration only, and not for the purpose of limitation.

What is claimed is:

1. A knee extender device, comprising:

a central connecting portion;

a first support leg and a second support leg extending from the central connecting portion and at an angle relative to each other; and a first terminal portion attached to the first support leg and a second terminal portion attached to the second support leg, the first terminal portion and the second terminal portion each configured to be positioned against an anterior surface of an upper leg or a lower leg of an individual, such that, in use, the central connecting portion is positioned on an anterior side of the individual above a knee joint of the individual and the first support leg and the second support leg each extend downwardly from the central connection portion toward the anterior surface of the upper leg of the individual or the anterior surface of the lower leg of the individual, and wherein the first support leg and the second support leg are comprised of a rigid material to allow the knee extender device to be pushed downward against a leg of the subject.

2. The knee extender device of claim 1, wherein the central connecting portion includes a first connecting member defining a slot for attaching the first support leg to the central connecting portion, and a second connecting member defining a slot for attaching the second support leg to the central connecting portion.

3. The knee extender device of claim 2, wherein the first connecting member and the second connecting member each comprise an outer connecting member positioned adjacent to an inner connecting member.

4. The knee extender device of claim 3, wherein each outer connecting member defines an outer slot, and wherein each inner connecting member defines an inner slot.

5. The knee extender device of claim 2, wherein the central connecting portion includes a curved upper surface having a convex shape, and wherein the first connecting member and the second connecting member extend downwardly from the curved upper surface.

6. The knee extender device of claim 1, wherein the central connecting portion includes a curved upper surface having a convex shape.

7. The knee extender device of claim 1, wherein the first terminal portion includes a terminal connecting member defining a slot for attaching the first support leg to the first terminal portion opposite the central connecting portion, and wherein the second terminal portion includes a terminal connecting member for attaching the second support leg to the second terminal portion opposite the central connecting portion.

8. The knee extender device of claim 1, wherein the first terminal portion and the second terminal portion each include a curved lower surface having a concave shape, and wherein each terminal connecting member extends upwardly from each curved lower surface.

9. The knee extender device of claim 1, further comprising a pad secured to a lower surface of each terminal portion.

10. The knee extender device of claim 1, further comprising a cord or belt having a length such that, upon placement of the knee extender device over the knee joint of an individual, the cord or belt extends from at least the central connecting portion to the foot of the individual.

11. The knee extender device of claim 1, wherein the central connecting portion comprises a central eyelet.

12. The knee extender device of claim 11, wherein the central eyelet comprises three central eyelets, each of the three central eyelets spaced at an angle relative to one another.

13. The knee extender device of claim 1, wherein the central connecting portion, the first support leg, and the second support leg are connected to one another about a pivot joint for expanding and collapsing the knee extender device.

14. The knee extender device of claim 1, wherein the first support leg, the second support leg, or both the first support leg and the second support leg are configured to extend from a first position to a second lengthened position.

15. A method of rehabilitating a knee joint of an individual, comprising:

applying a device according to claim 1 to a leg of the individual adjacent to the knee joint;

extending a cord or belt over at least part of the central connecting portion and around a foot of the individual; and applying tension to the cord or belt such that the knee extender device is pushed downward and extends the knee of the individual.

16. A knee extender device, comprising:

a first support leg;

a second support leg;

a central connecting portion including a curved upper surface having a convex shape, the central connecting portion further including a first connecting member extending from the curved upper surface and defining a slot for attaching the first support leg to the central connecting portion, and a second connecting member extending from the curved upper surface at an angle relative to the first connecting member, the second connecting member defining a slot for attaching the second support leg to the central connecting portion;

a first terminal portion attached to the first support leg opposite the central connecting portion; and a second terminal portion attached to the second support leg opposite the central connecting portion, the first terminal portion and the second terminal portion each configured to be positioned against an anterior surface of an upper leg or a lower leg of an individual, such that, in use, the central connecting portion is positioned on an anterior side of the individual above a knee joint of the individual and the first support leg and the second support leg each extend downwardly from the central connection portion toward the anterior surface of the upper leg of the individual or the anterior surface of the lower leg of the individual, and wherein the first support leg and the second support leg are comprised of a rigid material to allow the knee extender device to be pushed downward against a leg of the subject.

17. The knee extender device of claim 16, wherein the first connecting member and the second connecting member each comprise an outer connecting member positioned adjacent to an inner connecting member.

18. The knee extender device of claim 17, wherein each outer connecting member defines an outer slot, and wherein each inner connecting member defines an inner slot.

19. The knee extender device of claim 16, wherein the first terminal portion includes a terminal connecting member defining a slot for attaching the first leg to the first terminal portion opposite the central connecting portion, and wherein the second terminal portion includes a terminal connecting member defining a slot for attaching the second leg to the second terminal portion opposite the central connecting portion.

20. The knee extender device of claim 19, wherein the first terminal portion and the second terminal portion each include a curved lower surface having a concave shape, and wherein each terminal connecting member extends upwardly from each curved lower surface.

* * * * *